March 31, 1953    J. E. D. McCARTY    2,633,113
INTERNAL-COMBUSTION ENGINE

Filed May 13, 1952    5 Sheets-Sheet 1

INVENTOR:
JOHN E. D. McCARTY
BY: *Wallace and Cannon*
ATTORNEYS:

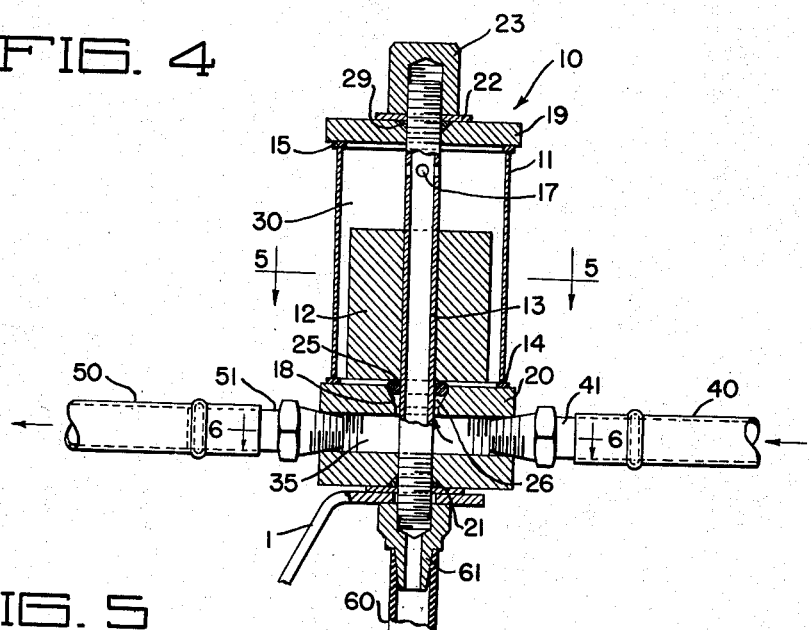
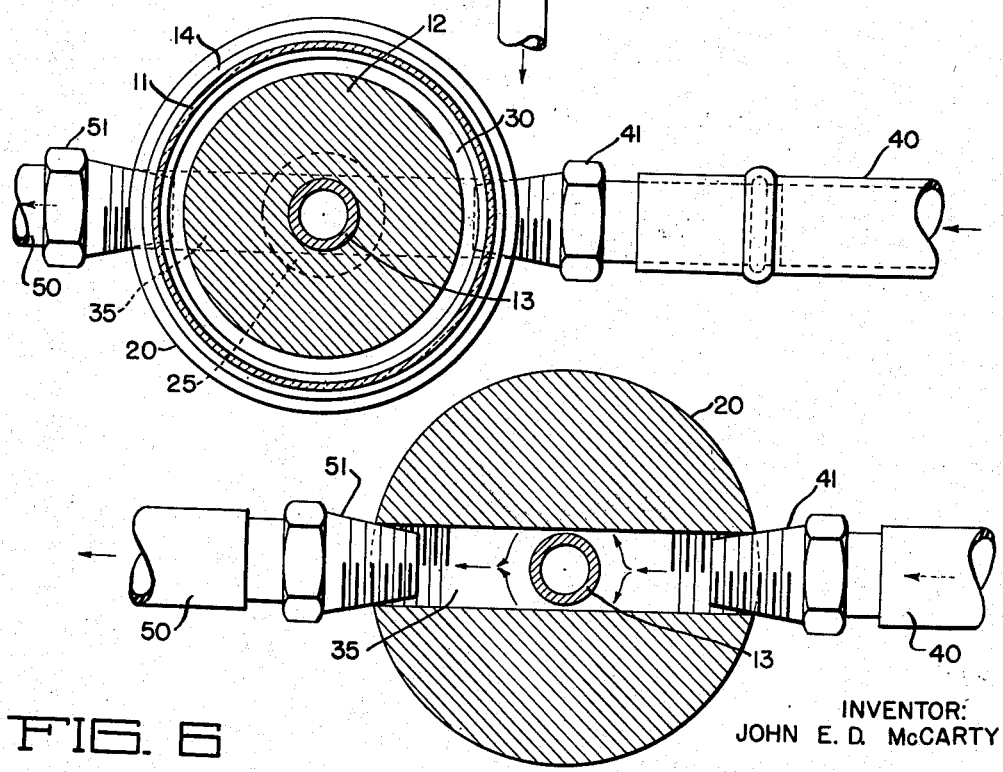

March 31, 1953  J. E. D. McCARTY  2,633,113
INTERNAL-COMBUSTION ENGINE
Filed May 13, 1952  5 Sheets-Sheet 3
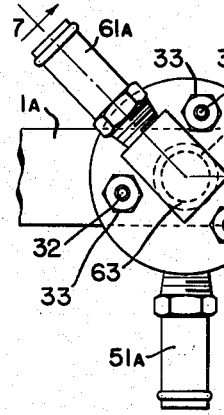
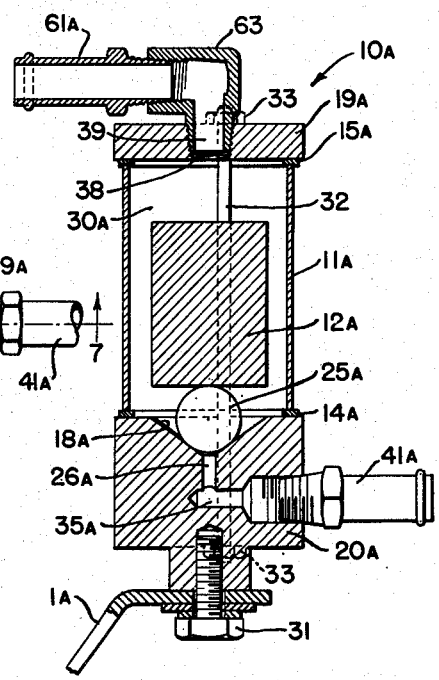
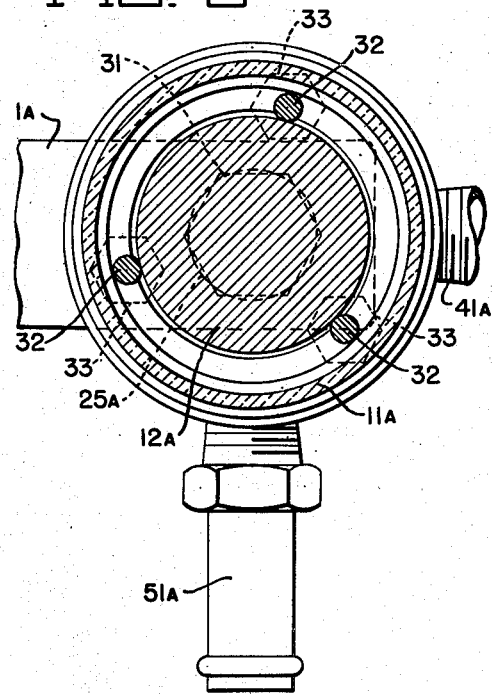
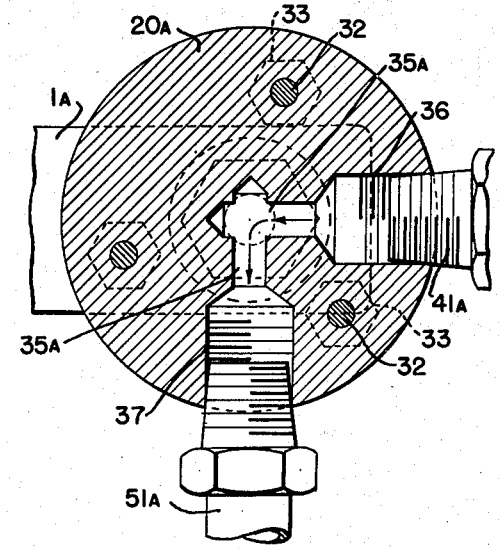
INVENTOR:
JOHN E. D. McCARTY
BY: *Wallace and Cannon*
ATTORNEYS:

March 31, 1953 J. E. D. McCARTY 2,633,113
INTERNAL-COMBUSTION ENGINE
Filed May 13, 1952 5 Sheets-Sheet 4
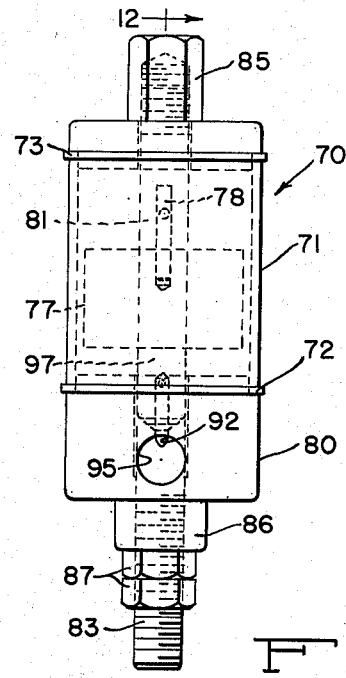
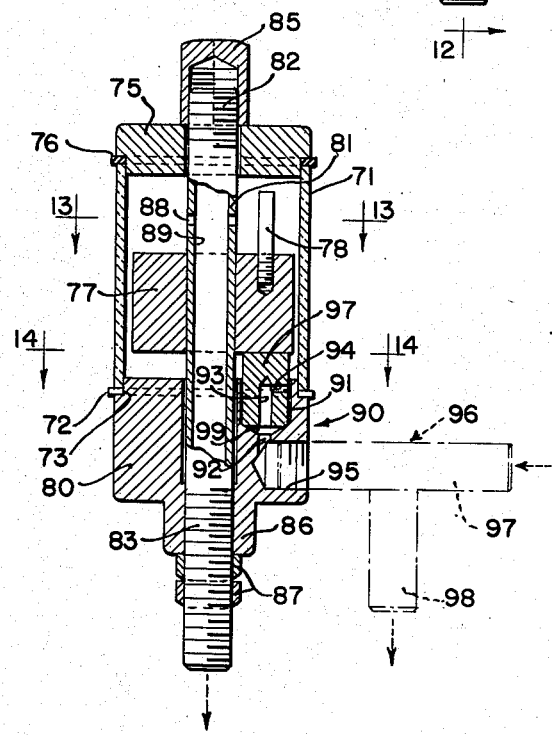
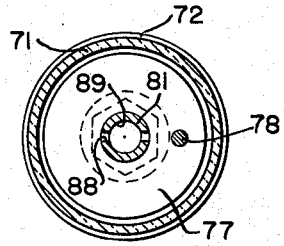
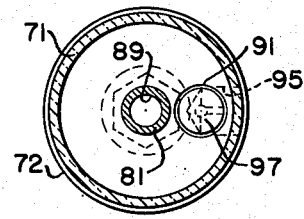
INVENTOR:
JOHN E. D. McCARTY
BY:
*Wallace and Cannon*
ATTORNEYS:

March 31, 1953 — J. E. D. McCARTY — 2,633,113
INTERNAL-COMBUSTION ENGINE
Filed May 13, 1952 — 5 Sheets-Sheet 5

Inventor:
John E. D. McCarty
By: Wallace and Cannon
Attorneys

Patented Mar. 31, 1953

2,633,113

UNITED STATES PATENT OFFICE 2,633,113

INTERNAL-COMBUSTION ENGINE

John E. D. McCarty, Wilmette, Ill., assignor of one-half to Herman C. Gould, Chicago, Ill.

Application May 13, 1952, Serial No. 287,509

13 Claims. (Cl. 123—119)

This application is a continuation-in-part of my application, Ser. No. 240,741 filed August 7, 1951, and now abandoned.

This invention relates to internal combustion engines and the primary object is to augment engine performance by placing the vapor space of the crankcase under automatic control of the several vacuum phases that may be extant in the intake manifold during operation of the engine, thus to utilize latent fuel and/or lubricating vapors contained therein while feeding a relatively large volume of relatively pure air directly to the carburetor intake at that time when the fuel mixture should be as lean as possible. It is a further primary object of this invention to afford means for diverting the main stream of vapors thus exhausted from the crankcase, and to eliminate to a large extent condensable vapors entrained in such a diverted stream at a predetermined time and in a particular manner.

It is a known fact that when an internal combustion engine is running at speeds above idling speed and the throttle suddenly closed, a relatively high vacuum, that is, substantially below atmosphere pressure, is created in the intake manifold. This high vacuum phase of engine operation results in the drawing of an excessive amount of atomized fuel through the throat or intake of the carburetor and into the fuel passage leading to the combustion chambers. Since the fuel mixture is excessively enriched as consequence, the effect is a large exhaust of unburnt fuel in the form of a cloud of noxious exhaust vapors, a condition known as "gassing." On the other hand, during the normal phase of engine operation, a mild vacuum only is present in the intake manifold as the result of the pumping action of the pistons, sufficient to feed the proper fuel mixture to the combustion chambers in accordance with the setting of the throttle valve.

In view of the fact that the accumulation of vapors in the crankcase, derived from the more volatile hydrocarbon components in the gasoline and lubricating oils, represents a highly efficient source of fuel and lubricant, it is an additional object of this invention to utilize the mild vacuum present during normal engine operation to feed these otherwise wasted fuels and light lubricants into the intake manifold as directly and efficiently as possible. Moreover, since it is essential to have the fuel mixture as lean as possible when the throttle is suddenly closed at high engine speeds, it is yet a further object of this invention to utilize the relatively high vacuum present at this phase of engine operation to actuate means capable of diverting the stream of vapors being exhausted from the crankcase, and to cause the stream so diverted to be partially stripped of its condensable vapor content leaving a large volume of relatively pure air to be fed directly into the carburetor, thus to partially dilute the fuel mixture being drawn into the intake manifold.

Another object of the present invention is to automatically determine the quality and/or quantity of exhausted vapors from the crankcase being fed to the combustion chamber of the internal combustion engine accordingly as different vacuums are extant during engine performance.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art.

In the drawings:

Fig. 4 is a vertical sectional view taken through the device of Fig. 2;

Fig. 5 is a horizontal sectional view taken on the line 5—5 of Fig. 4;

Fig. 6 is a horizontal sectional view taken on the line 6—6 of Fig. 4;

Fig. 7 is a vertical sectional view of the device shown in Fig. 2 and being taken on the line 7—7 of Fig. 10;

Figures 2, 3:
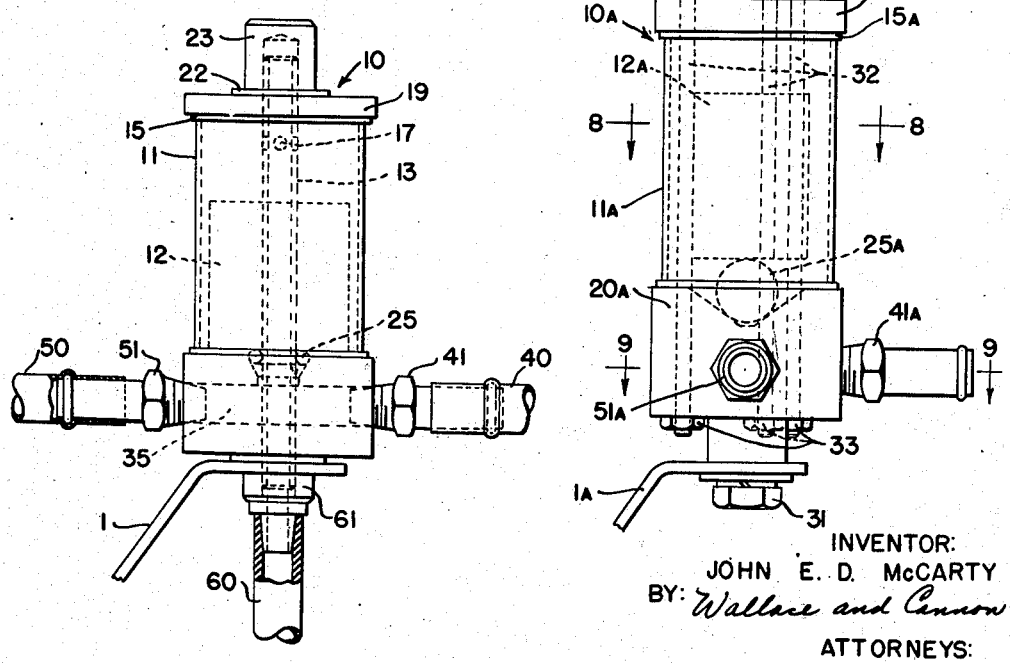
Fig. 2 is a side elevational view of one embodiment of the present invention.
Fig. 3 is a side elevational view, similar to Fig. 2, of another embodiment of the present invention.

Figs. 8 and 9 are horizontal sectional views taken on the lines 8—8 and 9—9, respectively, of Fig. 3;

Figure 10 is a top plan view of the device shown in Fig. 3;

Fig. 11 is a plan view of a modified form of the device constructed in accordance with the present invention;

3

Figure 15:
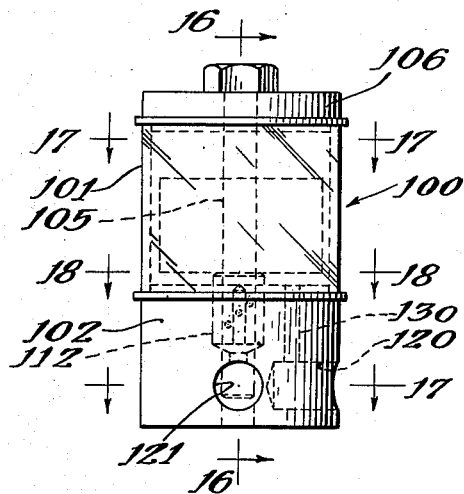
Figure 17:
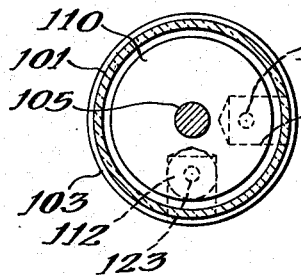
Figure 20:
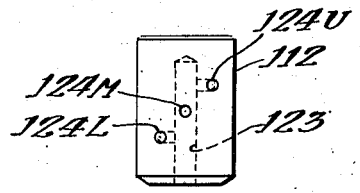

Fig. 12 is a sectional view taken on the line 12—12 of Fig. 11;

Figs. 13 and 14 are sectional views taken respectively on the lines 13—13 and 14—14 of Fig. 12;

Fig. 15 is a plan view of another modified form of the present invention;

Figs. 16, 17, 18 and 19 are sectional views taken respectively and substantially on the lines 16—16, 17—17, 18—18 and 19—19 of Fig. 15; and Fig. 20 is a detail view of a valve element.

Figure 1:
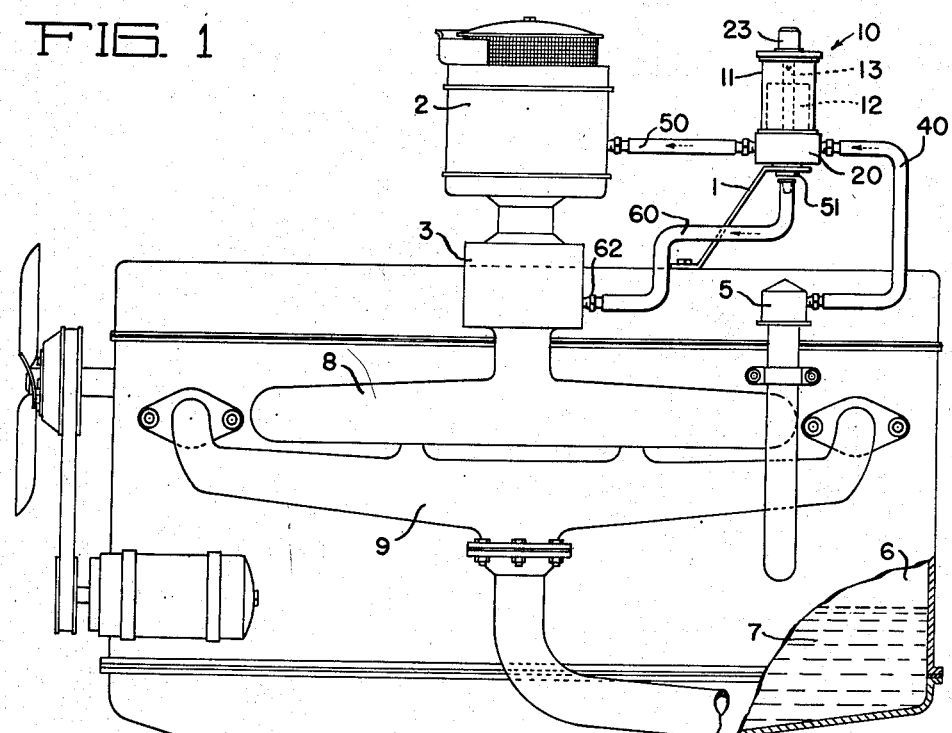
Fig. 1 is a side elevational view of an internal combustion engine broken away in part to expose the crankcase and showing a unit of the present invention mounted in operative position thereon.

In Figs. 1 to 20, inclusive, there are illustrated several embodiments of the present invention, and a typical manner of mounting a device embodying the principles of the present invention is depicted in Fig. 1 of the drawings. Broadly speaking, the present invention is characterized by a condensing means or chamber in combination with a valve means which is under control of the vacuum established in the intake manifold during operation of the internal combustion engine. A housing having a passage therein is operatively connected to the condensing chamber and valve means, and one end of said passage is adapted to be connected to the vapor space of the crankcase, and in this manner the vapor in the crankcase may be connected in turn to the condensing means. To the end that such connection may be accomplished, the passage is associated with a valve port opening into the chamber of the condensing means, and a passageway or opening leading from the condensing means is adapted to be connected to a line leading to the carburetor or intake manifold of the internal combustion engine. The aforesaid valve means, which is under control of the vacuum established during engine performance, is normally seated in a position closing the valve port opening into the condensing chamber, and consequently the stream of vapors exhausted from the crankcase may, if desired, be conducted directly to the air filter for instance and from thence through the carburetor into the intake manifold.

More specifically, and referring now to Fig. 1, one embodiment of the present invention is indicated at 10 as being mounted atop and adjacent the rear end of a conventional internal combustion engine. The device 10 is generally circular in cross section as shown in Fig. 5 and comprises a housing 20. Mounted on the latter is a hollow cylinder 11 containing a substantially solid cylindrical ballast member 12 which is carried on an elongated guiding member 13. The cylinder 11 is preferably constructed of glass, but may be of ceramic material, metal, or a synthetic resin, for instance. It will be understood that the particular location of the present device on the internal combustion engine is largely a matter of choice; however, the waste-vapor-charging and fuel-mixture-diluting device of the present invention should be mounted in a manner conducive to the shortest connection possible between the breather of the crankcase and the air filter. Thus, in practice, the device 10 is preferably mounted on the engine housing by means of a support 1 so that a conduit or line 40 from the breather 5 of the crankcase, generally indicated at 6, will be as short as possible, or in other words, attached to the forwardmost side of the breather rather than to the rearwardmost side as depicted, a separation of parts being made in Fig. 1 for purposes of clarity and understanding.

In Fig. 1, the crankcase 6 is shown as exposed and containing a level of lubricating oil 7.

4

Breather 5 of the crankcase is adapted to communicate with the vapor space thereof and is connected with the rearwardmost part of the housing 20 through flexible line 40. Communicating with the forwardmost part of the housing 20 is a conduit or line 50 connecting with the air intake 2 of the internal combustion engine, and a similar conduit 60 is extended to the carburetor 3 located above the intake manifold 8 and the exhaust manifold 9. As alluded to earlier, the line 50 may be connected to the air cleaner 2 if desired, and this in view of the fact that the vacuum in the intake manifold during normal engine speeds may be sufficient under some conditions to pull carbon particles, dust particles and the like from the walls of the crankcase, causing undesirable foreign matter to be entrained in the stream of air exhausted from the vapor space of the crankcase. Thus, by directing this stream of vapors, as will be pointed out below, to the air intake rather than directly to the intake manifold, assurance may be had, if desired, that any contaminating particles which may be present or entrained therein will be expeditiously removed, leaving only water vapor, light gasoline fractions, and light oil fraction vapors to be fed to the combustion chamber for the purpose of effecting a mild and beneficial water injection, increasing combustion efficiency, and affording a source of light lubrication for the pistons, valves, and cylinder walls.

As shown in Figs. 4 and 5, the cylinder 11, preferably of glass and representing a condensing chamber 30, is closed at the bottom by the circular housing 20, and at the top by a similarly configured cover member 19. Contained within the condensing chamber 30 is a cylindrical and preferably metallic ballast or valve control member 12, apertured longitudinally so as to be freely movable on a rigid guiding and conduit means 13 in the form of a hollow tube or rod, and shown as bearing against a ring valve 25 in the valve seat 18. The flexible conduits 40 and 50, representing the path of the stream of vapors being exhausted from the crankcase, each communicate with the respective ends of a horizontal passage 35 that is extended through and provided in the housing or base member 20 of the device 10. Connecting means in the form of nipples 41 and 51 are threadably mounted in the respective extremities of passage 35 and are of a size adapted to make a snug fit with the inner sides of the conduits 40 and 50. Thus, by making the line 40—50 all but continuous, the air or vapor stream comprising the desirable vapor particles can be directed into the intake manifold when the normal vacuum therein is sufficient to exhaust the vapor space of the crankcase, and since a short, direct path may thus be afforded, there is little chance for such vapors to be condensed during passage. In this latter respect, the walls of the conduits 40 and 50 are preferably as thick as possible and made of a material having little capacity for heat conductivity.

In Fig. 4 it will be observed that the condensing chamber 30 is communicable with passage 35 through a valve port 26. However, during normal engine operation, when vapors are being continuously directed through the passage or bore 35, the force of gravity is sufficient to urge the ballast member 12 firmly against the ring valve 25 to seat the latter firmly in the valve seat 18 of the valve port 20. Being thus led into and out of the bore 35 below the valve seat 18, the vapor stream indicated by the horizontal arrows in Fig. 4 can be diverted up into the condensing chamber 30 in a manner to be explained below, noting in Fig. 6 that the outside diameter of the guide rod 13 is substantially less than the inside diameter of passage 35 past which it is extended.

In order that the conduit or passage means 13 which mounts and guides the ballast member 12 will be rigid within the condensing chamber, it is threadably retained in the bottom of the passage housing 20 and projects therefrom a short distance as shown in Figs. 2 and 4 for the reception of a threaded nipple 61. Insofar as atmospheric pressure is concerned, the condensing chamber is isolated as much as possible by securing gaskets 14 and 15 to the open ends of cylinder 11, and threading cover member 19 and the closure cap 23 to the upper extremities of the hollow guide rod 13. In this manner, the condensing chamber 30 and the upper open end of the hollow guide rod 13 are completely sealed from the atmosphere. As a further assurance to the isolation of the condensing chamber, sectional conical recesses indicated at 28 and 29, Fig. 4, are provided for the reception of some convenient sealing materials 21 and 22 preferably placed therein after guide rod 13 has been mounted in the base and shortly before nipple 41 and closure cap 23 are screwed tightly to the respective ends of the guide rod.

The ballast member 12 constitutes a part of the valve means for opening and closing port 26, and in Fig. 4 this member is shown in the position it assumes during the low vacuum phase when vapors are being continuously fed or directed to the intake manifold, and it will be observed that additional valve means 25, in the form of a ring of synthetic rubber or some other fairly resilient material resistant to hydrocarbon liquids that may be condensed in chamber 30, is held in position by the ballast member thus sealing off valve seat 18 of the valve port 26. Since the valve is thus closed and sealed off at this phase, the vapor stream, depicted by the arrows in Fig. 6, being exhausted from the crankcase through conduit 40, simply passes around the opposite sides of that portion of the rod 13 contained within passage 35 and from thence out conduit 50. The chances for the vapors in the stream being condensed from their ideal vapor state prior to their reaching the air filter are at a minimum, and once drawn into the air filter 2, Fig. 1, entrained solid particles may be filtered out, while uncondensed hydrocarbon and water vapors may be drawn on into the intake manifold 8 and from thence to the combustion chambers.

Considering the other or high vacuum phase of actuation in which a stream of relatively pure air is fed directly to the intake manifold or carburetor in order to dilute the fuel mixture and reduce the tendency toward "gassing," it will be noted, Figs. 1, 2 and 4, that conduit 60 extends from the bottom of the base or housing member 20, where it is secured to nipple 61 threaded on the lowermost extension of the hollow guide rod 13, to nipple 62, Fig. 1, communicating with the carburetor generally indicated at 3. A port as 17 is provided in conduit 13 on a portion of the latter lying within the condensing chamber 30, thus establishing a direct connection between the carburetor and the condensing chamber. Since a pressure differential will always exist between the air intake and the carburetor or intake manifold during engine performance, the weight of ballast member 12 is correlated to the vacuum in the intake manifold so that it, together with the sealing ring 25, will be lifted from out of the valve seat 18 at a predetermined vacuum in the intake manifold, 18 to 21 inches of mercury for instance, to open port 26 communicating with passage 36. In this manner, valve actuation and therefore the direction of vapor flow is automatically controlled by a predetermined pressure differential between passage 35 and chamber 30. When port 26 of the valve is opened, the gases being exhausted from the crankcase will be drawn up through port 26 along the rearward side of guide rod 13 as depicted by the small arrow in passage 35 of Fig. 4, and expand into the condensing chamber 30. Little, if any, flow will proceed in the direction of conduit 50. The gases drawn into the condensing chamber 30 in this manner will tend to expand and therefore undergo a decrease in temperature, and some of the condensable components will tend to settle out along the inner sides of cylinder 11 and on the outer sides of the ballast member 12. Thus, the percentage of inert components and heavier hydrocarbons in the stream of vapors drawn through the passageways 17 and out conduit 13 to the carburetor is increased, and in this manner some of those vapors are stripped which might tend to enrich the fuel mixture in the carburetor at the precise time when it is desired to dilute this mixture as much as possible.

In Figs. 3, 7, 8, 9 and 10, I have shown a modified embodiment embodying the desirable features and functions of the present invention, and again there is provided a housing upon which is mounted a condensing means or chamber. A valve means is provided adjacent a passage formed within the housing for the purpose of directing a stream of gases into the condensing chamber at a predetermined condition of engine vacuum, while assuring that the vapors may otherwise be led directly to the intake manifold or carburetor. In these figures, the suffix "A" has been employed to designate parts similar to those of the modified form hereinbefore described in detail, while different numbers designate different parts.

Referring to Fig. 3, the modified form of the device, 10A, is adapted to be mounted in position on an internal combustion engine by means including a bracket 1A which is adapted to be secured to the lower part of a housing 20A as by a nut 31 in precisely the same manner as depicted for the embodiment 10 shown in Fig. 1. Nipples 41A and 51A, Figs. 8 and 10, are adapted to fit snugly into conduits (not shown) connected respectively to the breather 5 of the crankcase 6 and the air filter 2 feeding air through the carburetor 3 to the intake manifold 8 as was discussed above. Similarly, nipple 61A threaded into an elbow cap 63 is adapted to connect the carburetor or intake manifold directly with the interior of the condensing chamber. Provided internally in the base member or passage housing 20A is a right-angled passage 35A representing reduced extensions of a pair of larger passages 36 and 37 in which nipples 41A and 51A are respectively adapted to be screwed. Thus, the stream of vapors led from the crankcase enters housing 20A through an enlarged passage 36 and passes out through another enlarged passage 37 to the air filter 2 if desired. The reduced or inner extensions of passages 36 and 37 meet at a common point where a valve port 26A communicating with the condensing chamber, opens into passage 35A, and by means of this arrangement passage 35A is rendered communicable with the condensing chamber 30A at a predetermined value of intake manifold vacuum in a manner similar to that heretofore considered with respect to the port 26 and the passage 35.

In regard to the particular vacuum phase, Fig. 7 is similar to Fig. 4 in that the parts are shown in position dictating a direct flow of vapors from the crankcase through bore 35A to the air filter as depicted by the arrows in Fig. 9. In other words, at the time when it is desired to utilize the latent energies or qualities of the accumulated vapors in the crankcase for increasing engine efficiency, the flow thereof to the air filter is as direct as possible, port 26A being sealed off by a valve means due to the fact that the vacuum in the intake manifold is not sufficiently below atmospheric pressure to cause an opening of the valve port. Thus, a ball valve 25A, constituting a part of the valve means and preferably made of metal or some fairly resilient material resistant to hydrocarbons likely to be condensed in the chamber 30A, is shown as being effectively seated in a valve seat 18A by means of a cylindrical ballast or valve control member 12A which is gravity urged thereagainst. Accordingly, the valve port 26A is sealed off at its opening leading into the condensing chamber 30A and gases being exhausted from the crankcase are denied ingress thereto.

Instead of being centrally apertured for the reception of a guide means, the ballast means 12A of the modified form shown in Fig. 7 is retained within a cage consisting of guide rods 32 rigid within chamber 30A by virtue of their being extended through openings provided in the housing 20A and cover member 19A and held in position as by nuts 33. A cylinder 11A of suitable material is mounted on the housing 20A, and gaskets 14A and 15A are provided at either end thereof in order that the condensing chamber thus defined will be as airtight as possible. As shown in Fig. 7, a passageway or opening 38 is provided in the cover member 19A which closes off the top of the condensing chamber and is adapted for reception of the cap 63. Cap 63 is itself provided with a passage 39 communicating at one end with the opening 38 and is adapted at the other end for the reception of a nipple 61A which may be connected with a conduit leading to the carburetor as hereinbefore described, and in this manner the condensing chamber may be subjected to the influence of the vacuum established in the intake manifold.

The valve actuating means or ballast member 12A is similar to the corresponding means 12 considered above in that its weight is correlated to the vacuum establishable in the condensing chamber 30A. Thus, when a vacuum in the neighborhood of 18"–21" of mercury is extant in the intake manifold as the result of a sudden closing of the throttle valve at high engine speeds, this vacuum is immediately established in the condensing chamber 30A through passage 39 and opening 38. At this instant, ballast member 12A is drawn upwardly in chamber 30A against the force of gravity due to the pressure differential existing between the valve port 26A and the chamber 30A. Since the ballast member 12A no longer bears against the valve member 25A, the latter is unseated, opening the valve and allowing the stream of vapors to follow the path of least resistance up through port 26A and into the condensing chamber. Once in chamber 30A, vapors contained in the air exhausted from the crankcase condense out in the manner hereinbefore pointed out, leaving relatively pure air to be fed into the intake manifold through passages 38 and 39 at the precise time when it is desired to maintain the fuel mixture as lean as possible.

In Figs. 11–14 there is shown a further embodiment of the present invention generally indicated at 70 as comprising a cylindrical condensing chamber 71 mounted atop a similarly configured metallic base member or passage housing 80. As with the other forms 10 and 10A considered above, the condensing chamber 71 is preferably made of glass, plastic resinous materials, or the like, and a resilient gasket 72 is adapted to seal tightly the interface between the bottom of the glass cylinder 71 and annular rabbet 73 that is afforded at the top of the housing 80. The top of the condensing chamber is closed off by a closure member 75 and another gasket 76.

Extending axially of and through the condensing chamber 71 and housing 80 is a rigid conduit and guide member 81 that is threaded at its opposite ends as at 82 and 83. The upper threaded end portion of the conduit member 81 extends centrally through the closure member 75 and receives a threaded cap or nut 85 whereby the closure member 75 may be pressed or drawn down tightly against the sealing ring or gasket 76. The lower end of the housing 80 is formed with a bushing portion 86, and by means as nuts 87 the guide rod 81 may be fixedly mounted relative to the condensing chamber and housing of the device 70.

At one side, the housing 80 is formed with a passage 95 that is threaded to receive one end of an arm of a T-conduit as 96, Fig. 12. When thus mounted in the base member or housing 80, the other arm 97 of the T-conduit 96 is adapted to be connected to the breather of the crankcase and the branch or leg 98 thereof may be connected to the air filter or cleaner. Connecting with passage 95 at a point adjacent the closed end thereof is a valve port 92 and a valve means 90 which, when opened, renders the condensing chamber 71 communicable with the passage 95. Normally, that is, during the low vacuum phase of engine performance, the valve means 90 is maintained closed whereby the condensing chamber is isolated from the passage 95 and consequently the exhausted vapors from the crankcase follow the path 97—98 to the air cleaner.

In order that the stream of vapors normally passing through the arm 97 and leg 98 of the T-conduit 96 may be diverted up into the condensing chamber at a high vacuum phase of engine performance, member 81 is formed with an elongated bore or passageway 89 and the portion thereof within the condensing chamber is formed with openings or small passageways as 88, and when the lower or open end of the conduit 81 is connected to a line leading directly to the carburetor or intake manifold of the internal combustion engine, it will be seen that any vacuum in the intake manifold will also be established in the condensing chamber 71. Freely slidable on the guide rod or conduit member 81 is a ballast or valve control member 77 that is normally gravity urged against a valve member 97 that is located in a recess 91 in the housing 80. At the bottom of the recess 91 is a valve seat 99 which overlies the valve port 92, and the bottom of the valve member 97 is configured so as to normally fit snugly in the valve seat 99. Extending part way up through the valve member 97 and opening at the bottom thereof is a passage 93 that is in alignment with the valve port 92. The other or closed end of the passage 93 terminates adjacent the end of another passage 94 within the valve member 97. The latter passage opens at the side of the valve member, and in effect therefore the passages 92—93—94 amount to one continuous valve port. The passage 94 is so located relative to the valve member 97 and housing 80 that when the valve control member is effective to maintain and locate the valve member in the seat 99, its opening at the side of the valve member 97 is normally closed by the sides of the recess 91 thus assuring that the condensing chamber 71 is sealed off from passage 95.

The weight of the valve control or ballast member 77, as in the case of its counterparts 12 and 12A, described hereinabove, is adjusted so as to be lifted or vacuum-actuated away from the valve member 97, which of course is of still lighter weight, at a predetermined relatively high vacuum value established in the condensing chamber 71, say 18 inches of mercury, in contrast to relatively low vacuum values above 18 inches of mercury whereat the valve control member is effective to maintain the valve 90 closed. Thus, as in the other embodiments, when the predetermined relatively high vacuum value is reached, as when the throttle is suddenly closed, this relatively high vacuum is immediately established in the condensing chamber through the conduit 81 and passageways as 88, and consequently the ballast member 77 is lifted and the valve 90 opened. This results in an inrush of vapors from the conduit 96 and passage 95 into the condensing chamber wherein the vapors will circulate, and light fractions will tend to condense out again leaving a relatively large volume of relatively pure air to be drawn out the passageway 88 and the elongated passage 89 to the carburetor for the purpose discussed hereinabove. As an assurance that the ballast member will be vacuum lifted out of normal position only so far as to permit the passage 94 to clear the sides of the recess 91 when the valve member 97 is similarly lifted out of normal position, a pin 78 is fixed to the top of the ballast member. The top of the pin 78 normally clears the bottom of the closure member 75, as shown in Fig. 12, a distance corresponding approximately to the distance the opening of passage 94 is normally removed from the top of recess 91, and in any event a distance such that the valve member 97 never becomes completely withdrawn from out of the recess or valve chamber 91.

From the foregoing it will be seen that the described embodiments of the waste-vapor-charging and fuel-mixture-diluting device of the present invention places the vapor space of the crankcase under direct control of the several vacuum phases established in the intake manifold, and affords means for automatically diverting the main stream of gases being exhausted from the crankcase so that this stream can at least be partially stripped of its condensable components during one phase of engine performance. In the latter connection, while there is a tendency for particles of the condensed liquids as such to be drawn into the passageway leading from the condensing chamber, nevertheless the vacuum at this phase of operation is not sufficiently high to cause a re-vaporization of these liquids, and hence the object of feeding a large volume of relatively pure air to the carburetor at this time is accomplished. The inrush of air to the carburetor, augmenting that being drawn in through the air filter from the atmosphere, not only dilutes the fuel mixture as mentioned hereinbefore, but also helps to "break" or decrease the vacuum established by the pumping of the pistons, thus reducing the amount of liquid fuel being atomized in the carburetor and preventing the latter from being "loaded." It will be understood that once the pistons, and concomitantly the intake manifold pressure, assume a normal operating condition, the valve actuating or ballast means will be effective to cause a closing of the valve leading into the condensing chamber resulting once again in a normal flow of vapors to the intake manifold. It may also be pointed out that when the vapor stream is directed into the condensing chamber, the solid particles therein will tend to adhere to, or be occluded by, the condensed vapors.

In Figs. 15–20 there is illustrated still a further modification embodying the principle of the present invention, and in this instance the valve of the device is so constructed as to automatically regulate the volume of vapors fed into the carburetor or intake manifold in accordance with the amount of vacuum existing during the particular phase of engine performance. The modified form generally illustrated at 100 in Figs. 15–20 does not utilize two separate conduits, one to the air cleaner and one to the carburetor or intake manifold, but rather the device is adapted for a single conduit only. Even so, the same general principle as was employed in connection with Figs. 1–14 is employed in the device 100 in that variations in the vacuum phase of engine performance is utilized to determine the amount and quality of exhausted vapors from the crankcase being fed into the combustion chambers.

The device 100 embodies a chamber 101 closed at the top by a closure member 106 and at the bottom by a base member 102. The opposite ends of the cylinder 101 are sealed by gaskets 103 and 104, and a bolt 105 is threaded into the base 102 and made tight in order that the condensing chamber may be effectively sealed at either end by the members 106 and 102 respectively. Freely slidable on and about the portion of bolt 105 within the chamber 101 is a ballast member 110 which is adapted to cooperate with a valve member 112 to regulate the quality of vapors passing through and out the chamber 101 as will be described in more detail below.

Figure 16:
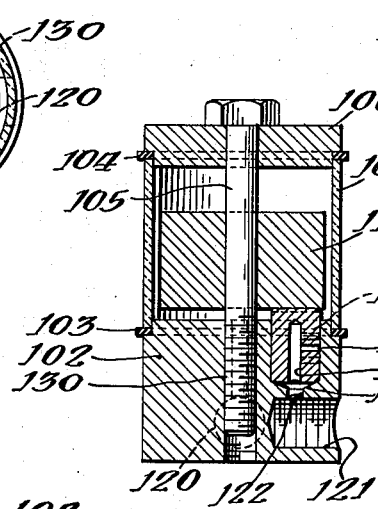
Figure 18:
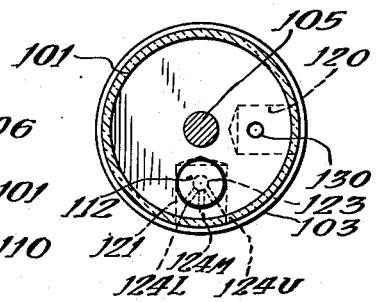
Figure 19:
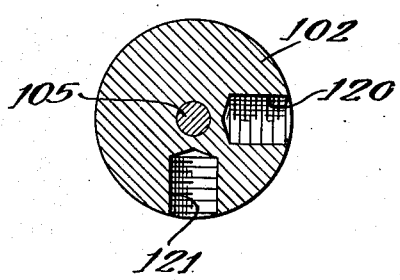

A horizontal passage 121 is formed in the base 102, and associated with this horizontal passage is a vertical passage or valve housing 125 at the lower end of which is a valve seat 113 and a valve port 122 of reduced diameter. The valve housing 125 opens into the condensing chamber 101, and valve 112 normally rests flush against the valve seat 113, being held therein by the weight of the ballast member 110 which presses against the top of the valve member 112 as shown in Fig. 16. A passage 123 is formed axially of the valve member 112, this passage being open at the bottom and aligned with the valve port 122.

As best shown in Fig. 20, the valve member 112 is provided with three openings 124L, 124M, and 124U which are arranged in a line inclined at approximately 45° to the horizontal. Each of these openings is representative of a related port as 124MP in the valve member bored at right angles to the valve passage 123, the latter passage terminating interiorly of the valve member 112 so as to be open at the one or lower end only. As shown in Fig. 16, the three ports as 124MP and 124UP and 124LP communicate with the passage 123, and when the valve is closed all three openings 124L, 124M, and 124U are located within the confines of the valve housing 125 so that in effect the chamber 101 is blocked off from the passage 121 when the valve is closed as shown in Fig. 16.

Another horizontal passage 121 is formed in the base member 102 and is extended substantially at right angles to the passage 120. Associated with the passage 121 is another vertical passage 130 which at its upper end opens into the chamber 101 and at its lower end into the passage 121. It will be seen therefore, that the chamber 101 is always in communication with the passage 121 but can communicate with passage 120 only when the valve member 112 is displaced upwardly in the valve housing 125 to the extent that at least the upper port 124U is free of the valve housing.

In operation, the passage 120 is to be connected to the vapor space of the crankcase and the passage 121 to the carburator or intake manifold. Thus, the vacuum, if any, existant in the intake manifold will be established in the chamber 101 and such vacuum will, as was hereinbefore described, affect the valve control member 110 and therefore the valve member 112 itself. It will be appreciated that, and assuming a given weight for the valve control member 110, the magnitude of the vacuum will determine the extent to which the member 110 will be moved upwardly relative to the bolt 105, and accordingly one or more of the openings 124L, 124M, and 127U will be located free of the passage 125. Thus, in the present instance, there is afforded a means whereby the quantity of vapors drawn into the chamber can be regulated in accordance with magnitude of the vacuum in the intake manifold. As an example, the weight of the valve control member can be adjusted to a vacuum of say 26" whereat it will be lifted to an extent as to expose only the port 124U; 21" whereat both the ports 124U and 124M will open into the chamber 101; and 16" whereat all three ports 124U, 124M, and 124L are opened. Accordingly, depending upon whether the vacuum in the intake manifold is at or near atmospheric pressure or approaches one or more of the higher vacuum values, the valve connecting the crankcase to the chamber 101 remains closed or is opened more and more to admit more and more vapors into the chamber 101 from whence such vapors are drawn into the intake manifold. It will be seen, therefore, that at the higher vacuum values where it becomes important to feed a large amount of air to the carburator or intake manifold, the valve is opened all the way and at lower vacuum values dilution of the fuel mixture is not so pronounced, preferably ceasing altogether at idling engine speeds.

While I have shown and described several embodiments of the present invention, it will be understood that these are capable of still further modification. The valve means and control means therefor may take various forms and similarly the passageway or opening which permits a vacuum to be established in the condensing chamber may assume various positions with respect to the chamber, but I have found the most effective position to be one exposing the vapors to the greatest possibility of condensation during high vacuum phase of engine operation. Thus, while I have illustrated and described the preferred embodiments of my invention, it is to be understood that these are capable of variation and modification.

I claim:
1. In a device of the character described having a fluid-conducting passage means adapted to direct vapors from the crankcase of an internal combustion engine to the intake manifold as a result of engine performance, a housing for the passage means, a condensing chamber mounted on the housing, a valve port interconnecting the passage means and condensing chamber whereby when the valve port is closed the chamber is sealed off from the passage means and when the valve port is open the passage and chamber are in communication, a passageway leading from the chamber and adapted to connect the chamber to a source of vacuum in the engine to thereby exhaust fluids in the chamber, said passageway being afforded in a portion of a tubular conduit member mounted axially of and in the condensing chamber, the tubular conduit member being closed at one end and opening exteriorly of the chamber at the other, and a valve port control means including a ballast member adapted to control opening and closing of the valve port, the last-named means being freely slidably mounted on the tubular conduit member within the condensing chamber and having its weight adjusted to a predetermined vacuum value of engine performance establishable in the condensing chamber through the said passageway, whereby at vacuum values on one side of said predetermined value the valve control means is gravity-urged to maintain the valve port closed and at vacuum values on the other side of said predetermined value the valve control means is lifted away from the valve port to maintain the same open.

2. In a device of the character described having a passage and valve means adapted to direct vapors from the crankcase of an internal combustion engine to a fluid-collecting chamber during engine performance, a housing for the passage and valve means, a fluid-collecting chamber sealably mounted on the housing, a valve interconnecting the passage and chamber whereby when the valve is closed the chamber is sealed from the passage and when the valve is open the passage and chamber are in communication, a passageway leading from the chamber and adapted to connect the chamber to a source of vacuum in the engine, and a valve control means in said chamber to control opening and closing of the valve in response to different vacuum phases of engine performance.

3. In the device according to claim 2, the valve control means including a ballast member freely mounted in the chamber and having the weight thereof adjusted to a predetermined vacuum value whereby the ballast member opens the valve when said predetermined value is established in the chamber.

4. In the device according to claim 2, the valve control means including a ballast member freely mounted in the chamber and having the weight thereof adjusted to a predetermined vacuum value whereby the ballast member opens the valve when said predetermined value is established in the chamber, said ballast members being freely slidably mounted on a tubular member extended axially of and in said chamber.

5. In the device according to claim 2, the said passageway leading from the chamber being afforded in a portion of said housing, and valve control means being the form of a cylindrical and metallic ballast member freely mounted on and guided by a tubular member disposed axially of and in the fluid-collecting chamber, the weight of said ballast member being adjusted to a predetermined vacuum value whereby at vacuum values below said predetermined value the ballast member is lifted to open the valve.

6. A device of the character described comprising a vapor collecting chamber sealed at one end by a housing having a vapor-conducting passage afforded therein, the chamber and passage being communicable through a valve port provided in the housing whereby fluids in the passage may be led into the chamber, a passageway leading directly from the chamber and adapted to connect the chamber to a source of vacuum, and a valve control means for the valve port, said last-named means being mounted in and freely movable axially of the said chamber and being responsive to a predetermined vacuum value in the chamber to open said valve port.

7. A device according to claim 6 in which the valve control means is in the form of a freely mounted gravity-urged metal cylinder.

8. In a device of the character described, a housing having a fluid-conducting passage therein, a condensing chamber mounted on the housing, a valve adapted to interconnect the condensing chamber and the passage, a passage leading exteriorly of the chamber and adapted to be connected to source of vacuum, and a valve control means within the condensing chamber adapted to open the valve at a predetermined vacuum value in the chamber whereby fluids in the passage may be drawn into the condensing chamber and out the conduit.

9. In the device according to claim 8, the valve control means being in the form of a freely mounted ballast member the weight of which is adjusted to said predetermined vacuum value whereby the valve is maintained opened at and below vacuum values corresponding to the said predetermined value and maintained closed at values above said predetermined value.

10. In a device of the kind described, a condensing chamber sealably mounted on a base member and being closed at the top, a passage in the base member adapted to be connected to a vapor source, valve means interconnecting the condensing chamber and said passage, a passageway leading from the condensing chamber and adapted to be connected to a source of vacuum whereby said vacuum may be established in said chamber, and a valve control means guided for free vertical movement in the chamber and being responsive to vacuum in the chamber to control the opening and closing of said valve.

11. A device of the kind described comprising a condensing chamber adapted to collect vapors, a first passage afforded in a base member for the chamber and being adapted to be connected to a source of vapors, another passage leading from the chamber, a valve for controlling the flow of vapors from the first passage into the chamber and out said other passage, and means controlling the opening and closing of the valve, said means being responsive to variations in vacuums established in said other passage.

12. A device according to claim 11 in which said means comprise a valve-control member adapted to regulate the flow of vapors into the condensing chamber according to variations in the vacuum, said valve-control member being mounted in said chamber to be responsive to variations in vacuum establishable therein.

13. A device of the kind described comprising a condensing chamber adapted to collect vapors, a first passage afforded in a base member for the chamber and being adapted to be connected to a source of vapors, another passage leading from the chamber and being adapted to be connected to a source of vacuum, a valve for controlling the flow of vapors from the first passage into the chamber and out of said other passage, and a control member responsive to variations in vacuum to control the opening of the valve accordingly as the vacuum varies, said control member being mounted in the condensing chamber in position to engage the valve and hold the same closed, said valve being formed with a plurality of ports adapted to be opened progressively as the vacuum increases.

JOHN E. D. McCARTY.

REFERENCES CITED

The following references are of record in the file of this patent:

UNITED STATES PATENTS

| Number | Name | Date |
|---|---|---|
| 941,478 | Watson | Nov. 30, 1909 |
| 1,285,873 | Wolf | Nov. 26, 1918 |
| 1,861,017 | Lake | May 31, 1932 |

FOREIGN PATENTS

| Number | Country | Date |
|---|---|---|
| 4,107 | Great Britain | Nov. 26, 1894 |